United States Patent
Treatch

(10) Patent No.: US 10,382,152 B1
(45) Date of Patent: Aug. 13, 2019

(54) SPECTRUM MONITOR SYSTEM AND APPARATUS FOR RADIO COVERAGE TESTING

(71) Applicant: IBT Connect R&D, LLC, Dallas, TX (US)

(72) Inventor: James Treatch, Dallas, TX (US)

( * ) Notice: Subject to any disclaimer, the term of this patent is extended or adjusted under 35 U.S.C. 154(b) by 0 days.

(21) Appl. No.: 16/022,884

(22) Filed: Jun. 29, 2018

(51) Int. Cl.
| | |
|---|---|
| H04W 8/00 | (2009.01) |
| H04W 52/02 | (2009.01) |
| H04B 17/318 | (2015.01) |
| H04W 24/08 | (2009.01) |
| H04L 29/08 | (2006.01) |
| H04W 4/90 | (2018.01) |

(52) U.S. Cl.
CPC .......... *H04B 17/318* (2015.01); *H04L 67/18* (2013.01); *H04W 4/90* (2018.02); *H04W 24/08* (2013.01)

(58) Field of Classification Search
CPC ........ G01C 21/206; G01S 5/0252; G01S 5/12
USPC .... 455/2.01, 440, 513, 452.2, 522, 69, 11.1, 455/446, 574, 422.1; 370/338, 485; 342/451, 417, 450
See application file for complete search history.

(56) References Cited

U.S. PATENT DOCUMENTS

| | | | |
|---|---|---|---|
| 4,087,639 A * | 5/1978 | Beene ....................... | H04J 1/06 370/482 |
| 5,398,276 A | 3/1995 | Lemke | |
| 6,584,175 B1 | 6/2003 | Kibria | |
| 6,876,951 B2 | 4/2005 | Skidmore | |
| 7,110,756 B2 | 9/2006 | Diener | |
| 7,596,372 B2 | 9/2009 | Warren | |
| 7,904,598 B2 | 3/2011 | Menniger | |
| 8,180,365 B2 | 5/2012 | Toone | |
| 9,429,434 B2 * | 8/2016 | O'Neill ............... | G01C 21/206 |
| 9,526,020 B2 | 12/2016 | Berlin | |
| 2004/0095276 A1 * | 5/2004 | Krumm ................. | G01S 5/0252 342/465 |
| 2004/0180665 A1 * | 9/2004 | Slawitschka .......... | H04W 16/18 455/446 |
| 2005/0128989 A1 * | 6/2005 | Bhagwat ................. | H04K 3/65 370/338 |
| 2006/0087425 A1 * | 4/2006 | Haeberlen ............. | G01S 5/0252 340/539.13 |
| 2007/0006250 A1 * | 1/2007 | Croy ...................... | H04H 60/37 725/9 |
| 2007/0132637 A1 * | 6/2007 | Kolavennu ............ | G01C 21/16 342/450 |

(Continued)

Primary Examiner — Tan H Trinh
(74) Attorney, Agent, or Firm — John A. Thomas

(57) ABSTRACT

A system and method for measuring and recording RF signal strengths received by a radio receiver inside a building from transmissions emitted by a radio transmitter outside the building. At selected locations inside the building, causing the radio transmitter outside the building to transmit on a pre-selected frequency; and at selected locations inside the building, measuring and recording received RF signal strengths from transmissions emitted by the radio transmitter outside the building on at least the pre-selected frequency; and, for each selected location inside the building, logging at least the date, time, receive frequency, and RF signal strength received at that location inside the building. A corresponding system and method measures RF signal strengths from in-building transmissions at the antenna site of the corresponding radio transmitter.

8 Claims, 7 Drawing Sheets

(56) References Cited

U.S. PATENT DOCUMENTS

| | | | |
|---|---|---|---|
| 2007/0241963 A1* | 10/2007 | Krumm | G01C 21/206 342/451 |
| 2008/0191941 A1* | 8/2008 | Saban | G01S 3/023 342/450 |
| 2008/0224930 A1* | 9/2008 | Chizhik | G01C 21/206 342/417 |
| 2010/0197222 A1* | 8/2010 | Scheucher | H01Q 19/30 455/11.1 |
| 2013/0109413 A1* | 5/2013 | Das | H04W 4/04 455/456.6 |
| 2014/0038587 A1* | 2/2014 | Murgan | H04W 48/16 455/422.1 |
| 2014/0045556 A1* | 2/2014 | Subramanian | H04W 52/0251 455/574 |
| 2015/0162974 A1* | 6/2015 | Trook | H04B 1/525 455/19 |
| 2015/0181548 A1* | 6/2015 | Varoglu | H04W 64/00 455/456.2 |
| 2016/0047882 A1* | 2/2016 | MacWilliams | G01S 5/0263 342/450 |
| 2017/0242094 A1* | 8/2017 | Chiodini | G01S 5/0289 |
| 2018/0019798 A1* | 1/2018 | Khan | H04B 7/15507 |
| 2018/0102858 A1* | 4/2018 | Tiwari | G06Q 10/04 |
| 2018/0121571 A1* | 5/2018 | Tiwari | G06Q 10/10 |
| 2018/0124569 A1* | 5/2018 | Shin | G01S 1/00 |
| 2018/0286213 A1* | 10/2018 | Schueler | H04W 52/0216 |
| 2019/0037351 A1* | 1/2019 | Prevatt | H04L 5/005 |

* cited by examiner

City of _____ TX
Location Antenna Site #1
Created : 1/8/2018 10:04:43 AM
Interval : 50 ms
Frequency : kHz
RSSI : dBm
Date : UTC
Talk Channel

| Time | Frequency | Step | Level |
|---|---|---|---|
| 03:40.6 | 808612 | 5000 | -70.44 |
| 03:40.7 | 808612 | 5000 | -67.63 |
| 03:40.8 | 808612 | 5000 | -69.00 |
| 03:40.9 | 808612 | 5000 | -67.36 |
| 03:40.9 | 808612 | 5000 | -69.11 |
| 03:41.0 | 808612 | 5000 | -69.91 |
| ... | ... | ... | ... |
| 03:42.1 | 808612 | 5000 | -68.14 |
| 03:42.1 | 808612 | 5000 | -69.28 |
| 03:42.2 | 808612 | 5000 | -70.25 |
| 03:42.3 | 808612 | 5000 | -69.04 |
| 03:42.4 | 808612 | 5000 | -67.91 |
| 03:42.4 | 808612 | 5000 | -66.81 |

Received Signal Strength at antenna site from transmissions out of Building

5200 _____ Dallas Tx
Location Floor 10 Grid 1013
Created : 1/8/2018 10:04:43 AM
Interval : 50 ms
Frequency : kHz
RSSI : dBm
Date : UTC
Control Channel

| Time | Frequency | Step | Level |
|---|---|---|---|
| 03:40.6 | 852250 | 5000 | -78.03 |
| 03:40.7 | 852250 | 5000 | -74.84 |
| 03:40.8 | 852250 | 5000 | -78.60 |
| 03:40.9 | 852250 | 5000 | -76.19 |
| 03:40.9 | 852250 | 5000 | -77.66 |
| 03:41.0 | 852250 | 5000 | -77.09 |
| ... | ... | ... | ... |
| 03:42.1 | 852250 | 5000 | -77.70 |
| 03:42.1 | 852250 | 5000 | -78.30 |
| 03:42.2 | 852250 | 5000 | -78.27 |
| 03:42.3 | 852250 | 5000 | -77.66 |
| 03:42.4 | 852250 | 5000 | -73.71 |
| 03:42.4 | 852250 | 5000 | -72.23 |

Received Signal Strength in building for transmissions out of Antenna site

Fig. 6

SPECTRUM MONITOR SYSTEM AND APPARATUS FOR RADIO COVERAGE TESTING

BACKGROUND

Technical Field

The present disclosure relates generally to public-safety radio communications systems, and more particularly to improved methods and apparatus for measuring the signal strength information of communication channels over such systems in buildings and structures to determine if adequate radio coverage exists for two-way communications between radios in the buildings or structures and a base station or repeater of interest.

Background

It is vitally important that public-safety personnel, such as fire or police or emergency-medicine responders be able to communicate by radio with one another and with their dispatch centers when entering and traversing large buildings or structures. (The terms "public safety" or "emergency response" are used interchangeably in this disclosure.) This radio communication is made difficult by all of the factors that typically trouble radio transmission. Any determination of signal strength in buildings must take into account that the propagation of radio-frequency (RF) energy in urban building environments cannot be accurately modeled. The main reason for the difficulty in generating an accurate propagation model is due to the many obstacles that exist in urban environments, all of which have different material properties which result in differing amounts of RF energy reflection and absorption. The obstacles, such as interior and exterior walls, partitions, desks, doors, glass, etc., have not even been completely characterized with respect to RF energy interactions due to the complexity of their structures. Even if the obstacles could be completely and accurately characterized for one building, it would be prohibitively expensive to construct a model for other and further buildings, even if it could be assumed that the structure or contents of a given building would not change. Therefore, RF signal strength must be determined empirically for each building.

Today, the International Fire Code (IFC), adopted by most jurisdictions, requires that minimum signal strengths for public-safety radio services be established for each building within the service area of a particular public-safety jurisdiction. See, e.g., 2015 International Fire Code, International Code Council, Inc., 4051 West Flossmoor Road, Country Club Hills, Ill., US, 60478, Section 510. The International Fire Code is a merger of the provisions in the National Fire Prevention Code, the Standard Fire Prevention Code and the Uniform Fire Code. So while the International Fire Code itself is relatively new, its provisions are not. They are based on fire codes that have been in use in the majority of the United States for decades. For the purposes of illustration in this disclosure, we refer to the provisions of the International Fire Code, but all relevant codes mandate that radio reception in and out of buildings meet some standard of adequacy.

Requiring that radio signal strengths at some defined location, either the base station or repeater station, or a particular building, implies some method of measuring, recording, and logging such signal-strength information. Indeed, the IFC, Section 510.5.3, mandates, for example, that the building owner must have the radio system tested to verify that two-way coverage on each floor of the building is not less than 90 percent. (The IFC makes many other detailed requirements for emergency responder radio systems.) Meeting the requirements of the IFC, as well as other requirements that may be imposed by a particular jurisdiction implies implementation of a robust system for measuring and recording relevant signal strengths and preparing summaries of tests to demonstrate compliance with all requirements. Such measurement will be greatly aided if emission of the signal to be measured can be correlated in time with the physical location of the measurement system, but the prior art does not disclose a method or system for doing so. Finally, a system meeting such requirements must be cost-effective, capable of rapid deployment, and capable of execution by personnel who are not specially-trained radio engineers.

SUMMARY

This summary is not intended to identify key or critical elements of the invention, or to delineate the scope of the invention. Its sole purpose is to present some concepts of the invention in a simplified form as a prelude to the more detailed description that is presented later. A method is disclosed for measuring and recording RF signal strengths received by a radio receiver inside a building from transmissions emitted by a radio transmitter outside the building. The method comprises: at selected locations inside the building, causing the radio transmitter outside the building to transmit on a pre-selected frequency; at selected locations inside the building, measuring and recording received RF signal strengths from transmissions emitted by the radio transmitter outside the building on at least the pre-selected frequency; and, for each selected location inside the building, logging at least the date, time, receive frequency, and RF signal strength received at that location inside the building.

DRAWINGS

Non-limiting embodiments of the present disclosure are described by way of example in the following drawings, which are schematic and are not intended to be drawn to scale:

FIG. 6 is a representative illustration of data received and logged by an embodiment of the spectrum monitor system.

DETAILED DESCRIPTION

Figure 1:
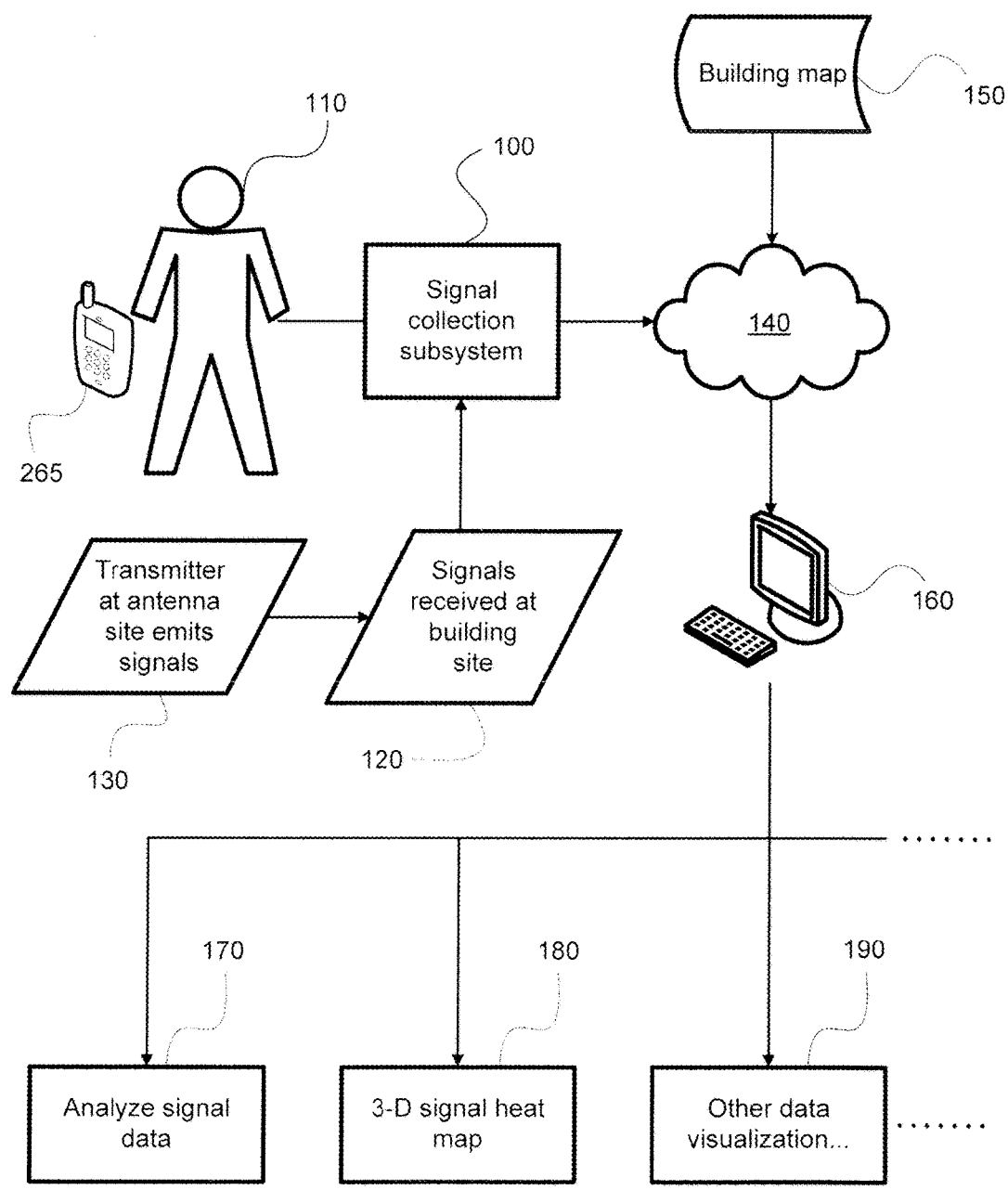
FIG. 1 is a schematic representation of an embodiment of the spectrum monitor system, illustrating the features thereof involved with receiving of radio signals in a building under test.

FIG. 1 shows schematically the overall functions of a representative spectrum monitor system at the location of the building site under test. A signal-collection subsystem 100 (discussed below) may be carried throughout a building under inspection by a human operator 110. In some embodiments, the signal-collection subsystem 100 may be transported by robotic means. The signal-collection subsystem 100 receives first signals 120 at the building site, which first signals 120 originate from an antenna site 130 such as a public-safety radio repeater antenna. As explained more fully below, the output of the signal-collection subsystem 100 may be uploaded to a remote server 140, preferably a cloud server, for storage. This output data may be analyzed by software running on a remote computer 160. The remote computer 160 has as input to it a map of the building under inspection, so that received first signals 120 collected and demodulated by the signal-collection subsystem 100 can be correlated with particular locations in the building. An analysis 170 of this processed data may be output and stored. In addition, other processing of the signal data may take place, such as, for example, generation of a heat map of signal strength 180 in the building, or other data visualization 190.

Figure 2:
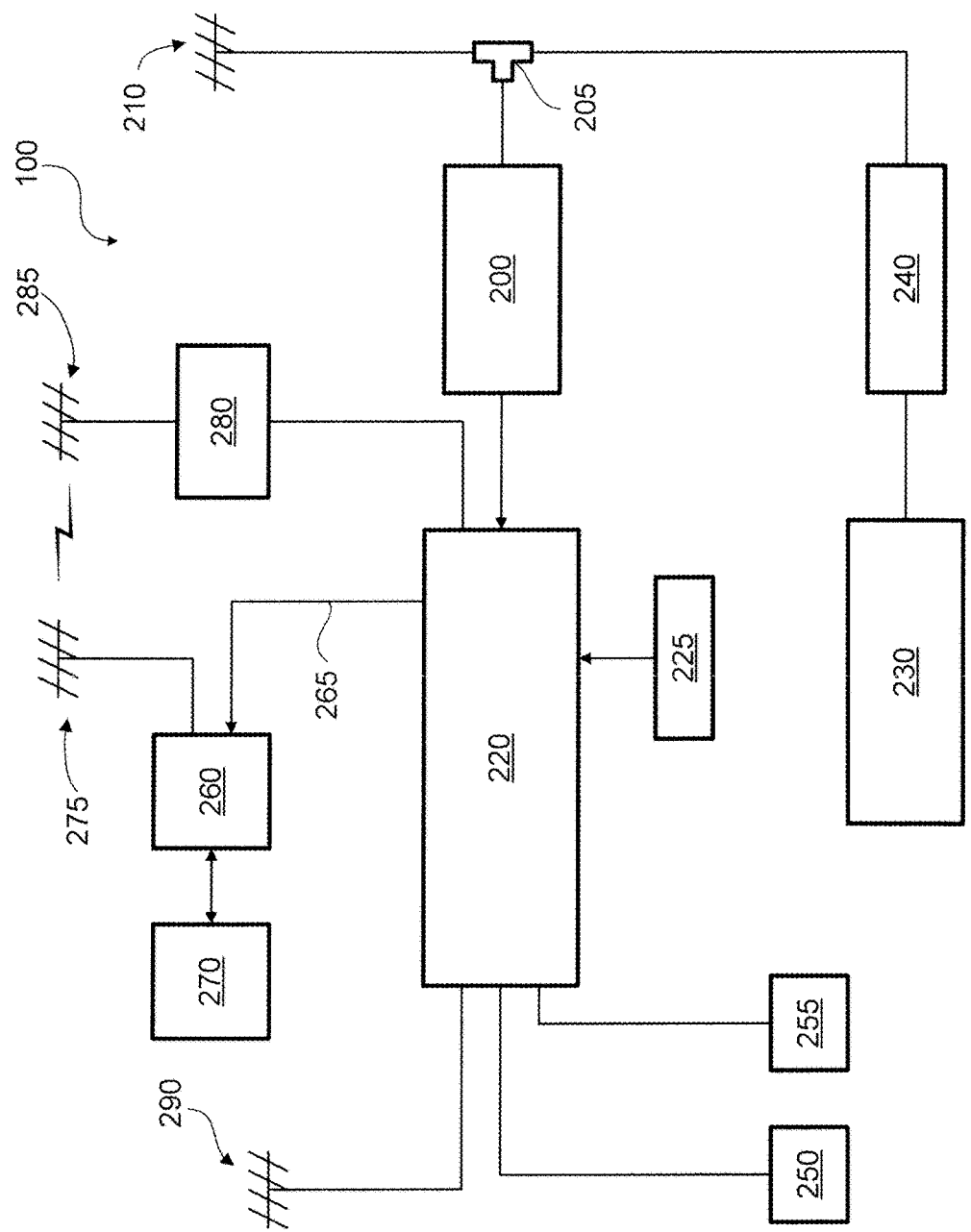
FIG. 2 is a schematic block diagram of the functional parts of the spectrum monitor system.

FIG. 2 is a functional block diagram of an embodiment of the signal-collection subsystem 100. In this embodiment, the signal-collection subsystem 100 comprises various devices which together comprise a software-defined radio (SDR). (The term "SDR" as used in this application refers to a software-defined radio device, or to software running on a computer that performs the software-defined radio functions, as the context requires.) As shown in the embodiment of FIG. 2, the SDR comprises a signal-processing first computer 220, further comprising a processor, memory, disk or flash memory storage, and input/output ports. A suitable signal-processing first computer 220 could be the Raspberry Pi computer, available from the Raspberry Pi Foundation and other sources. If the Raspberry Pi computer is used as the system signal-processing first computer 220, it preferably is running the Raspbian operating system, a version of GNU/Linux, designed specifically to work with the Raspberry Pi. Note that the system and apparatus described in this disclosure is not limited to implementation on the Raspberry Pi or in the Raspbian operating system, but may be implemented in many other computers and operating systems. For purposes of illustration only, however, this disclosure will describe at least one embodiment using the Raspberry Pi and the Raspbian operating system.

In the embodiment shown in FIG. 2, the signal-processing first computer 220 receives digitized data representing RF inputs through a connection, preferably a USB connection, from a suitable digital radio receiver 200, such as a demodulator-tuner device based on the Realtek 2832U chipset, manufactured by Realtek Semiconductor Corp. of Taiwan, or similar devices. The signal-processing first computer 220 in this embodiment is running SDR software to provide the signal processing for the applications described in this disclosure. Suitable SDR software is the RTL-SDR software well known in the art and available from http://www.rtl-sdr.com/. The demodulator-tuner 200, as shown in FIG. 2, is connected through a splitter 205 to a suitable antenna 210.

The reader should note that the claims are not limited to SDR's using the Realtek 2832US chipset, but encompass any other type of RF demodulator and tuner having an output suitable for input to SDR software, whether connected as physically separate devices, or integrated into common circuitry. Further, the claims are not limited to SDR's running the RTL-SDR software, but encompass any software capable of providing signal processing for the applications described in this disclosure. Finally, the claims are not limited to a system of separate computers as shown in this embodiment, but encompass any signal-processing system where the features described here are implemented in one special-purpose computer.

FIG. 2 further shows a frequency synthesizer 230 connected through a variable attenuator 240 to the splitter 205, for frequency calibration purposes, as described below.

The signal-processing first computer 220 of this embodiment has a first remote-command interface 250 to start signal logging operations, and a second remote-command interface 255 to stop signal logging operations. In practice, the remote-command interfaces, 250, 255 could be connections to, for example, a public-safety radio transceiver 265; in any case, so that the radio could be keyed on and off to cause a corresponding transmission from the remote antenna site 130. The signal-processing first computer 220 in the preferred embodiment connects to a WiFi access point 280, such as the Microtik Model 280, which access point 280 is connected to a Wi-Fi antenna 285, for the purpose discussed below. An optional Bluetooth connection 290 is also shown as an antenna connected to the first computer.

If present, the Bluetooth connection 290 can be used to retrieve digital audio representing, for example, the Harvard Sentences, known as a standard for delivered audio quality (DAQ). The Harvard sentences are a collection of sample phrases that are used for standardized testing of Voice over IP, cellular, and other telephone systems. They are phonetically balanced sentences that use specific phonemes at the same frequency they appear in English.

As an alternative to measurement of received signal strength, this digital audio may be input to the in-building radio transceiver 265 through the Bluetooth connection, to be broadcast each time that radio is keyed. A second in-building transceiver (not shown) receives those broadcast sentences from the transmitter at the antenna site 130 and records them in a digital audio file, preferably on a second computer 260 (see below) to be analyzed with conventional speech-recognition software to pass or fail the DAQ standards.

An optional input to the signal-processing first computer 220 from a GPS (global positioning system) gyroscope and accelerometer 225 is also shown. A suitable combination GPS gyroscope and accelerometer 225 is the Model RSP-PICANGPSACC, manufactured by SK Pang Electronics Ltd. of Harlow, Essex, UK. Data from this combination device 225 may be input to the signal-processing first computer 220 so that the starting location of the test, as described below, may be determined by the GPS location, and thereafter tracking the location of the radio receiver inside the building with respect to the starting point by calculating the location of the radio receiver inside the building according to data from the combination device 225 using its accelerometer for motion and its the gyroscope for direction.

FIG. 2 shows a second computer 260, preferably a small computer with necessary storage and communications peripherals running an operating system, such as the Windows 10 operating system from Microsoft, Inc. This second computer 260 communicates with the signal-processing first computer 220 either through a hard-wired Ethernet connection 265 or through the afore-mentioned Wi-Fi antenna. In an embodiment, the second computer 260 is assumed to comprise a third computer 270, such as a hand-held tablet computer, itself comprising a graphical-user interface (GUI) to facilitate communication with, and control of, the signal-processing first computer 220. The third computer 270 with the GUI thus provides an operator with a convenient handheld means of controlling the signal-collection process and its logging.

Figure 3:
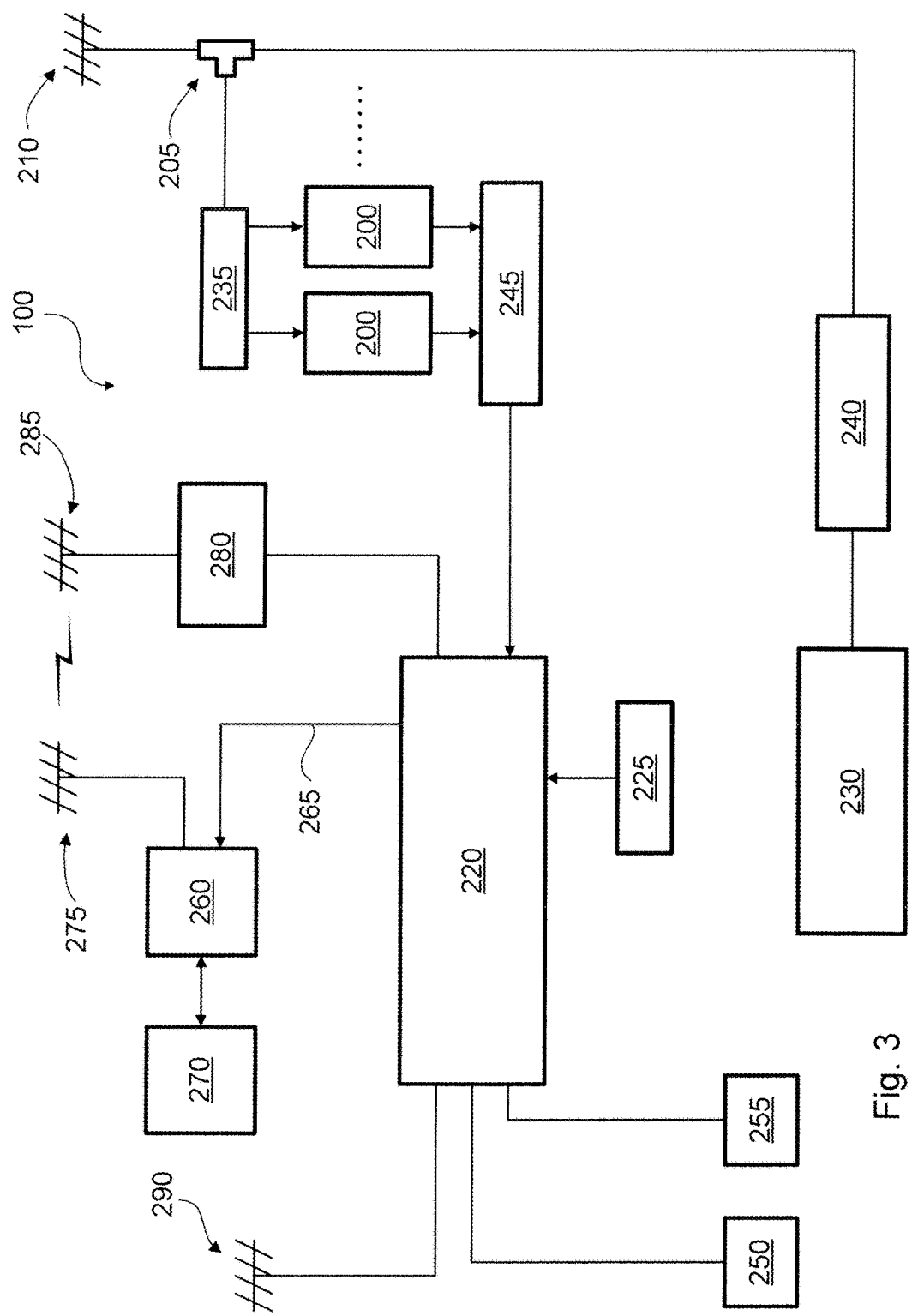
FIG. 3 is a schematic block diagram of the functional parts of another embodiment of the spectrum monitor system having multiple software-defined radios.

FIG. 3 shows another embodiment of the spectrum monitor system illustrated in FIG. 2, although in this case, FIG. 3 describes a system located at the public-safety transmitter antenna site 130. In FIG. 3, a single antenna 210 is used, as described above, but multiple RF signal splitters 235 deliver signals to multiple SDR's 200 (where FIG. 3 illustrates a plurality of SDR's 200). A USB hub 245 receives outputs from the plurality of SDR's 200, and provides input to the first computer 220. The plurality of SDR's 200 in this embodiment measure and record all frequencies of the system under test. Since trunked radio talk channels change rapidly, a human operator would be required to visually monitor spectrum displays to verify that the antenna site is recording the correct frequency. By recording all frequencies at all antenna sites, the determination of the site with the best signal strength during transmissions out of buildings can be analyzed after testing is completed, so that human monitoring during the test is not required.

Figure 4:
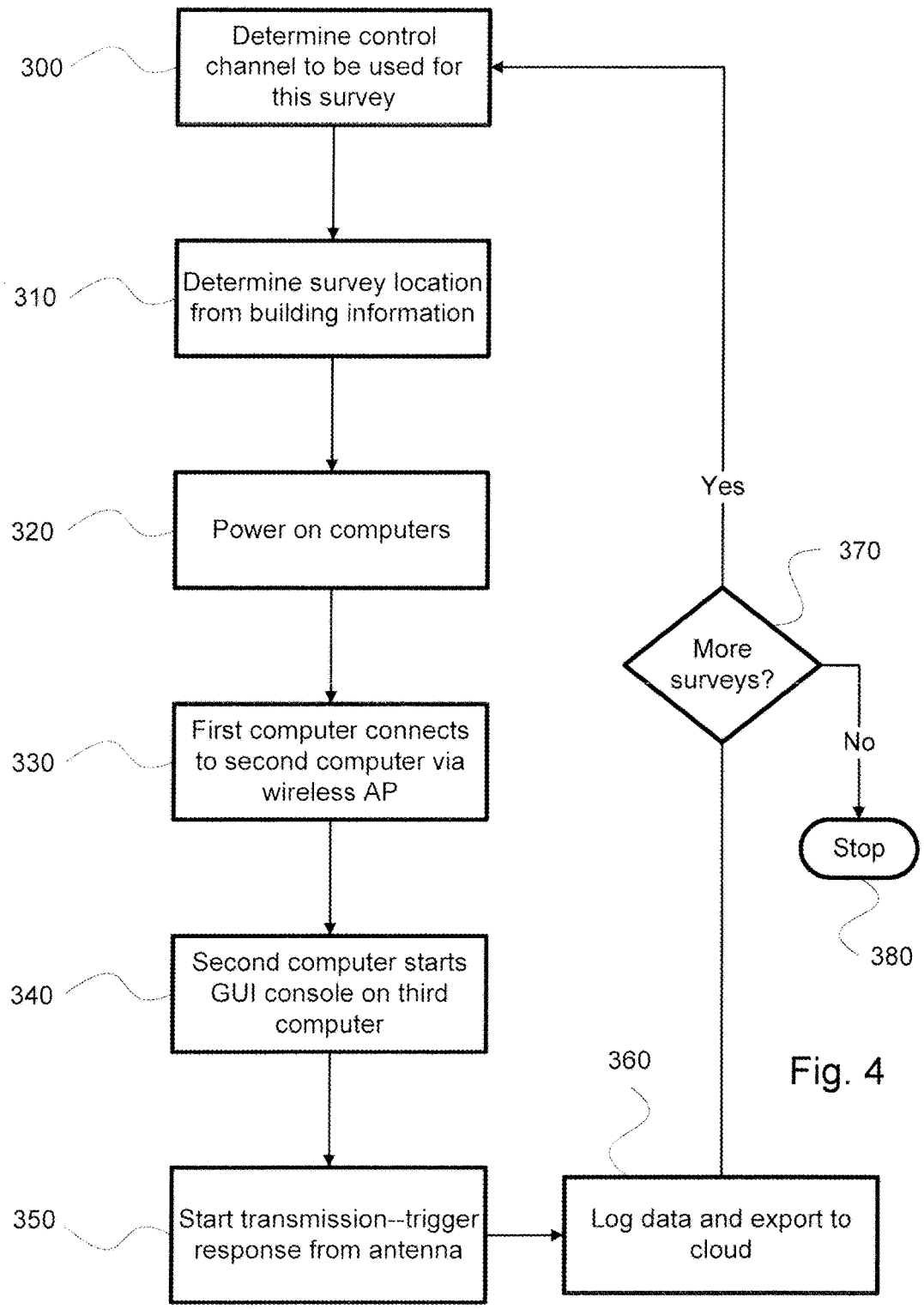
FIG. 4 is a flowchart of procedures implementing the functions at a building site of an embodiment of the spectrum monitor system.

FIG. 4 is a flow chart of typical operation of the spectrum monitor system, showing the operation of the system at a building location to be tested for signal strength. It is assumed that the signal collection subsystem is on the location and under the control of a human operator 110.

At step 300, the operator determines the control channel of the public-safety radio system under test (we are assuming that this is a trunked radio system, as are all modern public-safety systems). At step 310 the operator determines the starting location for the test as shown by a building drawing, usually a computer-aided-drafting drawing, supplied by some third party, such as the building owner. At step 320, components of the signal collection subsystem are powered on. At step 330 the third computer 270 supporting the GUI interface is powered on and connects to the wireless access point 280. The GUI interface on the third computer 270 displays the output of the SDR running on the signal-processing first computer 220. At step 340, the remote-data-protocol (RDP) running on the third computer 270 connects to the second computer 260 through the wireless access point 280. At step 350, the second computer starts the GUI interface on the third computer and the connection to the signal-processing computer 220 running the SDR software.

At step 360 the signal collection subsystem collects data representing the received signal strength at the location of the operator 110 in the building. The received signal at the building location is a signal on the specific control frequency for the radio system that is triggered at the antenna site by a corresponding signal collection subsystem 100 located there, as described below and in FIG. 5. The data may be logged in any convenient format for later data extraction, such as comma-separated-value format. At step 370, this data is logged and is exported via an internet connection, typically supplied by the public-safety organization, to a remote server 140, usually a cloud-based server. At step 380, a check is made if further surveys are to be made, as would usually be the case, and if so, control returns to step 300 (in this case, the signal collection subsystem 100 and its component parts may be assumed to still be powered on). If more surveys are not to be done, signal collection activity may stop at step 390.

Figure 5:
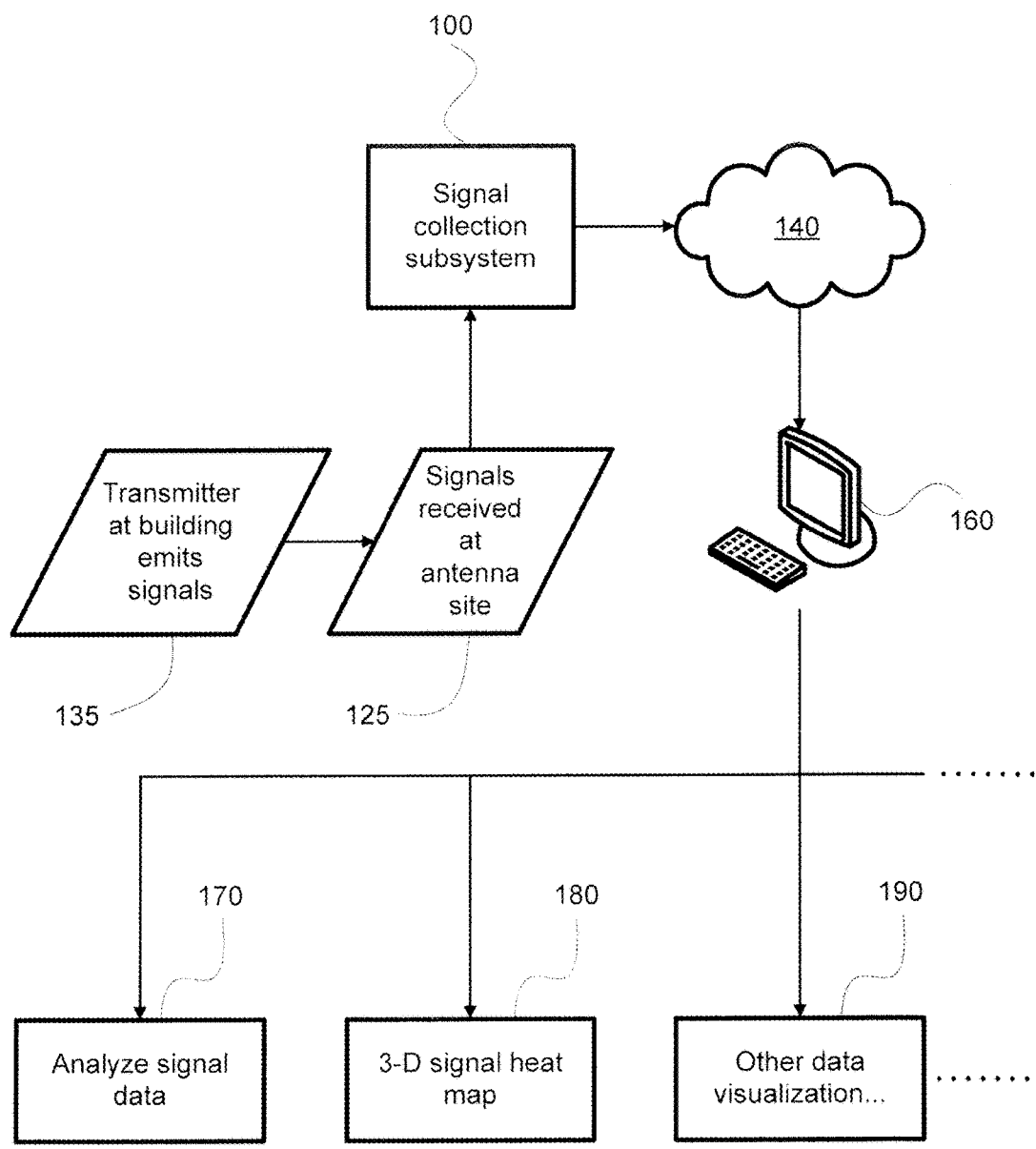
FIG. 5 is a schematic representation of an embodiment of the spectrum monitor system, illustrating the features thereof located at the antenna site of a radio system.
Figure 7:
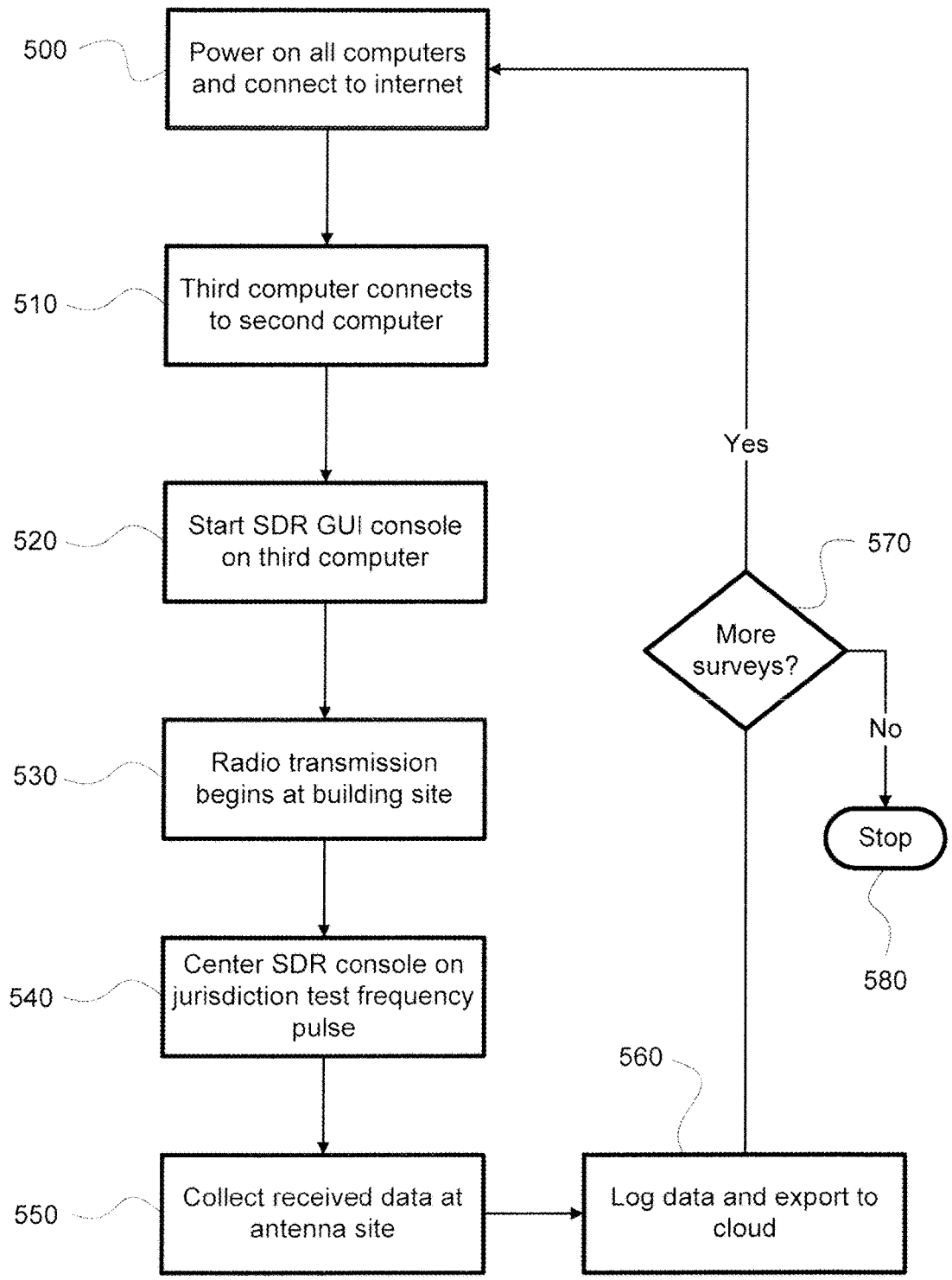
FIG. 7 is a flowchart of procedures implementing the functions at an antenna site of an embodiment of the spectrum monitor system.

FIG. 5 shows schematically the overall functions of a representative spectrum monitor system, where the signal-collection subsystem 100 is located at the site of the public-safety radio antenna. The signal-collection subsystem 100 receives second signals 125 at the antenna site 130, which second signals 125 originate from a public-safety radio transceiver 265 at the building 135. As explained more fully above, for the corresponding signal-collection subsystem 100 located in the building under investigation, the output of the signal-collection subsystem 100 may be uploaded to a remote server 140, preferably a cloud server, for storage. This output data may be analyzed by software running on a remote computer 160. Received first signals 120 are collected and demodulated by the signal-collection subsystem 100 and can be correlated with particular locations in the building, because the transmission of signals at the building 135 are correlated in time with the second signals 125 received at the antenna site 130 (See FIG. 6). An analysis 170 of this processed data may be output and stored. An example of such data output is provided in FIG. 6. In practice the public-safety transceiver 265 would be repeatedly keyed ON for 59 seconds and OFF for one second and many signal strength measurements are collected and stored continuously while traversing a building floor. The testing is then stopped, and a file of data, as illustrated by example in FIG. 6, is exported corresponding to that floor. The test can then be restarted and stopped on the next floor. Preferably, the exported file of data (FIG. 6) is identified by file name with the building and floor under test. In addition, other processing of the signal data may take place, such as, for example, generation of a heat map of signal strength 180 in the building, or other data visualization 190.

FIG. 6 is a flow chart showing operation of the signal collection subsystem 100 at the antenna site of the public-safety radio system. From the point of view of the antenna site, it is necessary to collect signals from the site of the building under survey, to determine if received signal strength at the antenna site meets the regulatory requirements. Therefore, most of the signal collection subsystem 100 devices are duplicated at the antenna location. At step 500 the signal collection subsystem 100, including the second computer 260 and the third computer 270 are powered up. At step 510 the third computer (preferably a tablet device) 270 connects to the second computer by RDP. At step 420, the transmitter at the antenna site is keyed at fixed intervals, such as every 59 seconds, on the test frequency, as explained above. The signal from the transmitter at the antenna site 130 is received and its signal strength logged. The method just described may also receive signals from both "simulcast" and "multicast" radio systems and is adaptable to such systems. A "simulcast" system simultaneously transmits the same signal, on the same frequency, at the same time, from different radio transmitter sites. This makes it easy for the user to roam from one antenna site coverage area to a neighboring one. A "multicast" system also transmits the same information simultaneously from different sites, but does so using a different frequency for each site. Either the operator, or the intelligence built into the radio, will switch channels as the user moves from one area to another. The logged signal strengths received by the disclosed embodiments may be parsed by software techniques known in the art, and signal strengths for particular antenna sites thereby recovered as desired.

At step 530, the GUI interface on the third computer, displaying the output of the SDR running on the first computer is started. At step 540, the SDR display on the GUI interface is centered on the test frequency amplitude, which frequency is supplied by the jurisdiction operating the public-safety radio system.

At step 550, data representing radio signals received at the antenna site by the signal collection subsystem 100 there located is collected. At step 560, this logged data is exported via an internet connection, where the IP address for such connection is typically supplied by the public-safety organization being served. At step 370, this logged data is exported via the same or a similar internet connection to a remote server 140, usually a cloud-based server. At step 570, a check is made if further surveys are to be made, as would usually be the case, and if so, control returns to step 500 (in this case, the signal collection subsystem 100 and its component parts may be assumed to still be powered on). If more surveys are not to be done, signal collection activity may stop at step 480.

None of the description in this application should be read as implying that any particular element, step, or function is an essential element which must be included in the claim scope; the scope of patented subject matter is defined only by the allowed claims. Moreover, none of these claims are intended to invoke 35 U.S.C. Section 112(f) unless the exact words "means for" are used, followed by a gerund. The claims as filed are intended to be as comprehensive as possible, and no subject matter is intentionally relinquished, dedicated, or abandoned.

I claim:

1. A method for measuring and recording RF signal strengths received by a radio receiver inside a building from transmissions emitted by a radio transmitter outside the building; the method comprising:
    at selected locations inside the building, causing the radio transmitter outside the building to transmit on a preselected frequency;
    at selected locations inside the building, measuring and recording received RF signal strengths from transmissions emitted by the radio transmitter outside the building thereby caused on at least the pre-selected frequency; and,
    for each selected location inside the building, logging at least the date, time, receive frequency, and RF signal strength received at that location inside the building.

2. The method of claim 1, where the RF transmissions outside the building originate in at least one public-safety radio repeater.

3. The method of claim 1 where the measuring and recording received RF signal strengths from transmissions outside the building further comprises:
    starting a test run on a selected floor within the building;
    transiting the radio receiver through the selected floor within the building, and, during such transiting, measuring and recording received RF signal strengths from transmissions outside the building on at least the preselected frequency.

4. The method of claim 1, further comprising:
    determining a starting point location in the building according to a GPS position; and,
    tracking the location of the radio receiver inside the building with respect to the starting point by calculating the location of the radio receiver inside the building according to data from an accelerometer for motion and from a gyroscope for direction.

5. A method for measuring and recording RF signal strengths received outside a building from transmissions within the building, where the location selected to receive the in-building transmissions further comprises a radio receiver capable of receiving, measuring, and recording the RF signal strengths from in-building transmissions; the method comprising:
    starting a test run on a selected floor within the building;
    transiting the radio transmitter through the selected floor within the building, and, during such transiting, selectively keying the radio transmitter at regular intervals;
    logging, at the location selected to receive in-building transmission, at least the date, time, receive frequency, and RF signal strength received from the selectively keyed radio transmissions.

6. The method of claim 5, where the location selected to receive the in-building transmissions is at least one public-safety radio repeater antenna site.

7. A system for measuring and recording RF signal strengths received by a radio receiver inside a building from transmissions emitted by a radio transmitter outside the building; the system comprising:
    a receiver and demodulator for RF signals;
    a signal-processing computer;
    the receiver and demodulator operatively connected to the signal-processing computer; the signal-processing computer comprising a software-defined radio;
    the signal-processing computer capable of causing at least one radio transmitter remote from the building to transmit on a preselected frequency;
    the software-defined radio having an output representing the frequency and signal strength of signals received from the remote radio transmitter so caused to transmit;
    the signal-processing computer operatively connected to a remote computer server; where the remote computer server comprises a computer program for correlating the output of the software-defined radio with the location of the signal-processing computer within the building.

8. A system for measuring and recording RF signal strengths transmitted by one or more radio transceivers inside a respective one or more buildings; the system comprising:
    a receiver and demodulator for RF signals;
    a signal-processing computer;
    the receiver and demodulator operatively connected to the signal-processing computer; the signal-processing computer comprising a plurality of software-defined radios;
    the signal-processing computer capable of causing at least one of the one or more radio transmitters inside the one or more buildings to transmit on a preselected frequency;
    each of the plurality of software-defined radios having an output representing the frequency and signal strength of signals received from at least one or more of the radio transmitters inside the one or more buildings;
    the signal-processing computer operatively connected to a remote computer server; where the remote computer server comprises a computer program for correlating the output of the plurality of software-defined radios with the location of the one or more radio transmitters inside the one or more buildings.

* * * * *